May 8, 1928.  
G. R. LANMAN  
1,669,302  
COMBINATION BRUSH AND DUST PAN  
Filed Sept. 2, 1927   2 Sheets-Sheet 2
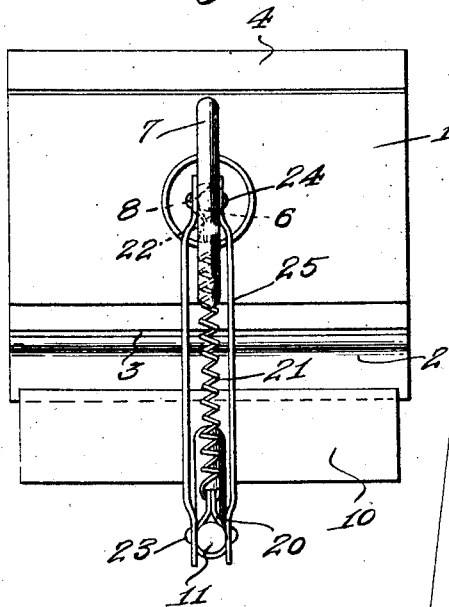
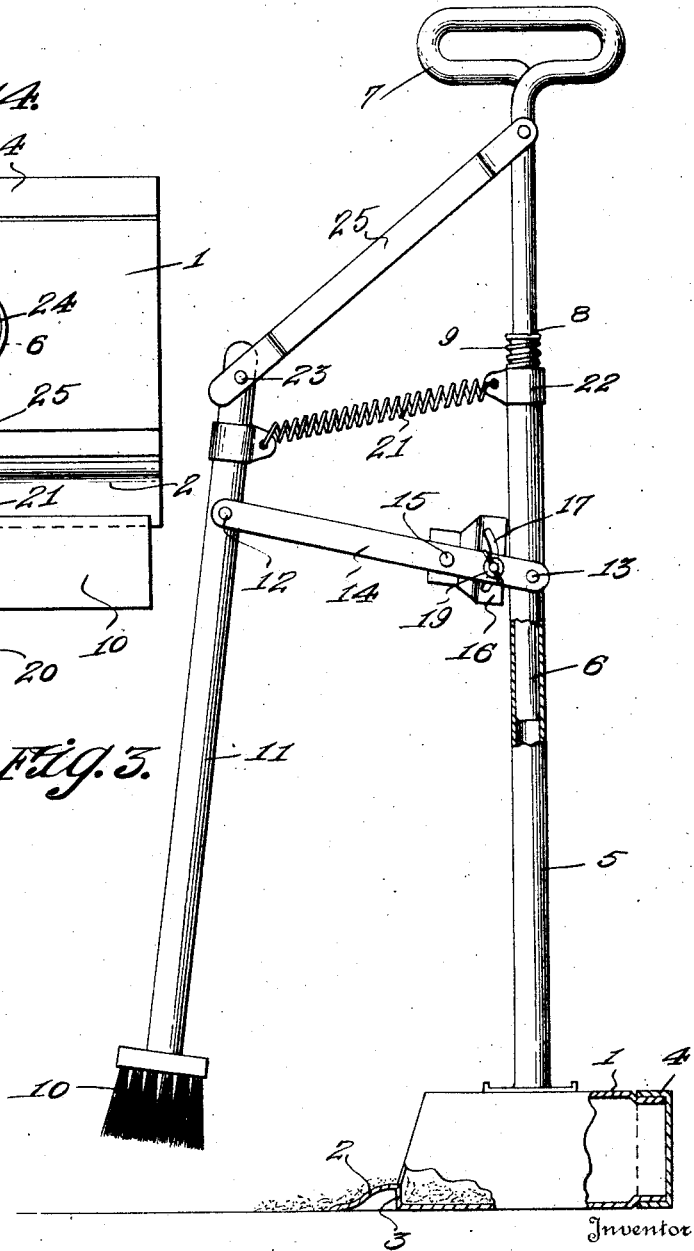
Inventor  
Guy R. Lanman,  
By Victor J. Evans  
Attorney Patented May 8, 1928.

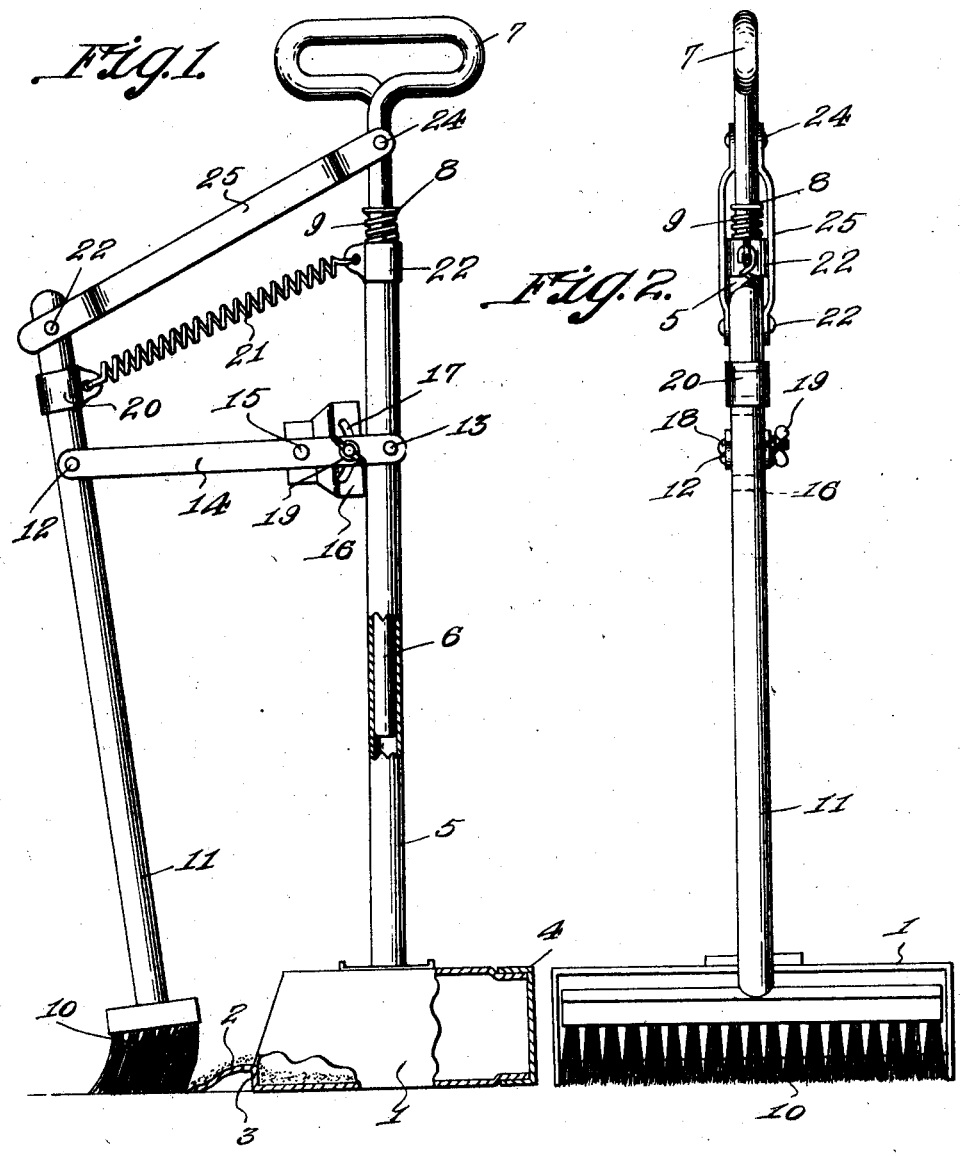

1,669,302

UNITED STATES PATENT OFFICE.

GUY R. LANMAN, OF EL RENO, OKLAHOMA.

COMBINATION BRUSH AND DUSTPAN.

Application filed September 2, 1927. Serial No. 217,237.

My present invention has reference to a combination brush and pan, associated in such a manner that the brush will be normally elevated above the pan, but susceptible to a downward and sweeping movement in the direction of the pan by a simple operation of the handle for the pan so that dust and other accumulations will be accurately directed and swept into the pan.

A further object is the provision of a combination brush and pan in which the pan is formed with a lip at the inlet end thereof of such a construction as to prevent the outlet of accumulations deposited therein, the said pan having means at the rear thereof to permit of the emptying of the deposits therefrom, and the lip serving as a guide means for a normally elevated brush, which latter is associated with the handle or standard for the pan in a manner that will cause the downward movement and inward sweeping of the brush with respect to the pan when the handle is lowered, there being stop means for limiting the movement of the brush in both of its vertical directions.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a side elevation of my improvment, parts being broken away and parts in section.

Figure 2 is a front elevation thereof having parts also in section.

Figure 3 is a view substantially similar to Figure 1 but showing the brush elevated.

Figure 4 is a top plan view of the improvement.

The pan 1 may be of any desired material, metal preferred. The pan has its outer end partly open, but the wall arising from the bottom of the said open end is rounded outwardly and downwardly to form a lip 2, and the said wall with what I will term a shoulder 3. This shouldered portion of the pan prevents the material in the pan from being accidentally spilled or otherwise removed therefrom while the lip 2 serves as a guide for the material to be delivered into the pan as well as a guide for the brush which will hereinafter be described. The pan has its rear end open, and this end of the pan, in the showing of the drawings, is reduced and has arranged thereon a flanged closure cap 4.

Arising from the closed top of the pan 1 there is a tubular member in the nature of a standard 5. The standard 5 receives therein a rod or shank 6 whose outer end is formed with a handle 7. A stop element or flange 8 is arranged on the rod 6 and surrounding the rod and contacting with the flange or stop element 8 and with the outer end of the standard 5 there is a coil spring 9 which normally moves the rod and its handle outwardly through the standard 5. The brush is broadly indicated by the numeral 10. The handle for the brush is indicated by the numeral 11 and is preferably adjustably fixed to the brush head. Pivotally secured, as at 12, to the handle 11, and likewise pivotally secured, as at 13, to the standard 5 there is a link 14. Pivotally secured to the link, as at 15, there is a stop link 16. The stop link has an arcuate slot 17 therethrough and passing through this slot and likewise passing through the link there is a headed bolt 18 which is engaged by a wing nut 19. The inner and active face of the stop block is arranged in close proximity to one side of the standard 5 so that the corners of the said stop block will be brought into contact with the said standard for limiting the upward and downward swinging motion of the brush. The stop block may be swung upon the link so that such movement of the block is accurately adjusted. Above the pivot 12 there is preferably adjustably fixed on the handle 11 a sleeve or collar 20 having an ear extension to which is attached one end of a helical spring 21. The second end of the spring is connected with an ear on a sleeve or collar 22 that is fixed to the outer end of the standard 5. By reference to the drawings it will be seen that the spring is arranged at an upward inclination with respect to the link 14. Pivotally secured, as at 23, adjacent to the outer end of the handle 11 for the brush 10, and likewise pivotally secured, as at 24, to the movable handle 7 for the pan 1, adjacent to the outer end of the shank 6 of the said handle 7, there is a link 25. This link is disposed at an angle substantially similar to the angularly arranged spring 21. The spring 21 will, of course, normally contract and thus swing the link 14 at an upward angle and the link 25 at a downward angle with a result that the handle 11 is arranged in the angular position as disclosed by Figure 3 of the drawings, and whereby the brush 10 is elevated above the floor surface. This movement of the brush handle 11 is accelerated by the spring 9. The block 16 limits the movement of the parts in this direction. A downward pressure upon the handle 7 will cause the outward swinging of the link 25 with respect thereto and impart a downward movement to the brush 10. A further movement of the handle 7 in a downward direction will cause the bristles of the brush to sweep the floor surface and to likewise travel over the lip of the pan 1 and sweep the accumulations on the floor into the pan. A release of pressure on the handle will return the parts to their initial position and to the position illustrated by Figure 3 of the drawings.

The improvement is of a comparatively simple nature and the normally elevated or raised brush permits of the pan being properly directed to piles of dust accumulated in the ordinary sweeping. As a matter-of-fact, the movement of the pan in the direction of the dust will cause the major part of such material to be guided over the lip and into the pan and the floor surface will be cleanly swept by the operation of the handle 7 and the swinging and sweeping movement of the brush 10. The drawings disclose only one satisfactory embodiment of the improvement as I hold myself entitled to make such changes in the details of construction, material employed and etc., as fall within the scope of what I claim.

Having described the invention, I claim:

1. In a device of the kind described, a pan, a hollow standard arising from the pan, a handle member having a stem that is slidably received in the standard, spring means influencing the stem outward through the standard, a brush having a handle portion, a link pivotally secured to the handle of the brush and to the standard, an angularly arranged link pivotally secured to the handle of the brush and to the rod below the handle thereof, an angularly disposed spring connecting the handle of the brush to the top of the standard and a stop element between the first mentioned link and the standard.

2. In a device of the kind described, a pan, a hollow standard arising from the pan, a handle member having a stem that is slidably received in the standard, spring means influencing the stem outward through the standard, a brush having a handle portion, a link pivotally secured to the handle of the brush and to the standard, an angularly arranged link pivotally secured to the handle of the brush and to the rod below the handle thereof, an angularly disposed spring connecting the handle of the brush to the top of the standard, a stop element between the first mentioned link and the standard, and a pivotally secured swingable adjustable stop block carried by the first mentioned link and having its corners disposed for contact with the standard, as and for the purpose set forth.

In testimony whereof I affix my signature.

GUY R. LANMAN.